(12) United States Patent
Birnbaum et al.

(10) Patent No.: US 8,587,417 B2
(45) Date of Patent: Nov. 19, 2013

(54) SYSTEMS AND METHODS FOR MAPPING MESSAGE CONTENTS TO VIRTUAL PHYSICAL PROPERTIES FOR VIBROTACTILE MESSAGING

(75) Inventors: David M. Birnbaum, Oakland, CA (US); Chris Ullrich, Ventura, CA (US); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 375 days.

(21) Appl. No.: 12/502,647

(22) Filed: Jul. 14, 2009

(65) Prior Publication Data
US 2010/0013653 A1 Jan. 21, 2010

Related U.S. Application Data

(60) Provisional application No. 61/080,978, filed on Jul. 15, 2008, provisional application No. 61/080,981, filed on Jul. 15, 2008, provisional application No. 61/080,985, filed on Jul. 15, 2008, provisional application No. 61/080,987, filed on Jul. 15, 2008, provisional application No. 61/148,312, filed on Jan. 29, 2009, provisional application No. 61/181,280, filed on May 26, 2009.

(51) Int. Cl.
*H04B 3/36* (2006.01)

(52) U.S. Cl.
USPC ........................................ 340/407.1; 345/173

(58) Field of Classification Search
USPC ......... 340/407.1, 669, 686.1, 407.2; 455/466, 455/566, 567; 345/173, 156
See application file for complete search history.

(56) References Cited

U.S. PATENT DOCUMENTS

| | | | |
|---|---|---|---|
| 4,873,623 | A | 10/1989 | Lane et al. |
| 5,666,499 | A | 9/1997 | Baudel et al. |
| 6,573,883 | B1 | 6/2003 | Bartlett |
| 6,803,924 | B1 | 10/2004 | Snibbe et al. |
| 6,903,723 | B1 | 6/2005 | Forest |
| 7,081,882 | B2 | 7/2006 | Sowden et al. |

(Continued)

FOREIGN PATENT DOCUMENTS

| | | |
|---|---|---|
| EP | 0 899 650 | 3/1999 |
| EP | 1 401 185 | 3/2004 |

(Continued)

OTHER PUBLICATIONS

International Preliminary Report on Patentability mailed Jan. 27, 2011 for corresponding International Application No. PCT/US2009/050579.

(Continued)

*Primary Examiner* — Toan N Pham
(74) *Attorney, Agent, or Firm* — Kilpatrick, Townsend & Stockton LLP

(57) ABSTRACT

Systems and methods for mapping message contents to virtual physical properties for vibrotactile messaging are disclosed. For example, one disclosed method includes the steps of receiving a sensor signal from a sensor, the sensor configured to detect an interaction with a messaging device, determining a virtual physical property of a virtual message object based at least in part on the sensor signal, determining a haptic effect based at least in part on the virtual physical parameter; and generating a haptic signal configured to cause an actuator to output the haptic effect.

23 Claims, 6 Drawing Sheets

(56) References Cited

U.S. PATENT DOCUMENTS

| | | | |
|---|---|---|---|
| 7,176,886 B2 | 2/2007 | Marvit et al. | |
| 7,191,191 B2 | 3/2007 | Peurach et al. | |
| 7,450,110 B2 | 11/2008 | Shahoian et al. | |
| 7,468,573 B2 * | 12/2008 | Dai et al. | 310/317 |
| 7,548,232 B2 | 6/2009 | Shahoian et al. | |
| 7,721,968 B2 | 5/2010 | Wigdor | |
| 7,788,032 B2 | 8/2010 | Moloney | |
| 7,810,247 B2 | 10/2010 | Fourquin et al. | |
| 8,123,614 B2 | 2/2012 | Kulas | |
| 8,306,576 B2 | 11/2012 | Cho et al. | |
| 2001/0035854 A1 | 11/2001 | Rosenberg et al. | |
| 2001/0045941 A1 | 11/2001 | Rosenberg et al. | |
| 2002/0177471 A1 | 11/2002 | Kaaresoja et al. | |
| 2003/0063128 A1 | 4/2003 | Salmimaa et al. | |
| 2003/0100969 A1 | 5/2003 | Jones | |
| 2003/0162595 A1 | 8/2003 | Serbanescu | |
| 2005/0052430 A1 | 3/2005 | Shahoian et al. | |
| 2005/0179617 A1 | 8/2005 | Matsui et al. | |
| 2005/0184696 A1 | 8/2005 | Anastas et al. | |
| 2005/0216867 A1 | 9/2005 | Marvit et al. | |
| 2006/0028453 A1 | 2/2006 | Kawabe | |
| 2006/0061545 A1 | 3/2006 | Hughes et al. | |
| 2006/0181510 A1 | 8/2006 | Faith | |
| 2006/0255683 A1 | 11/2006 | Suzuki et al. | |
| 2006/0256074 A1 | 11/2006 | Krum et al. | |
| 2006/0279476 A1 | 12/2006 | Obata | |
| 2006/0279542 A1 | 12/2006 | Flack et al. | |
| 2006/0284849 A1 | 12/2006 | Grant et al. | |
| 2007/0040810 A1 | 2/2007 | Dowe et al. | |
| 2007/0066283 A1 | 3/2007 | Haar et al. | |
| 2007/0139366 A1 | 6/2007 | Dunko et al. | |
| 2007/0152984 A1 | 7/2007 | Ording et al. | |
| 2007/0242056 A1 | 10/2007 | Engelhardt et al. | |
| 2007/0247442 A1 | 10/2007 | Andre et al. | |
| 2008/0020843 A1 | 1/2008 | Wolinsky | |
| 2008/0168403 A1 | 7/2008 | Westerman et al. | |
| 2008/0287147 A1 * | 11/2008 | Grant et al. | 455/466 |
| 2008/0300055 A1 | 12/2008 | Lutnick et al. | |
| 2009/0073118 A1 | 3/2009 | Yamaji et al. | |
| 2009/0100384 A1 | 4/2009 | Louch | |
| 2009/0167509 A1 | 7/2009 | Fadell et al. | |
| 2009/0167701 A1 | 7/2009 | Ronkainen | |
| 2009/0295743 A1 | 12/2009 | Nakajoh | |
| 2009/0309825 A1 | 12/2009 | Sodergren et al. | |
| 2010/0013777 A1 | 1/2010 | Baudisch et al. | |

FOREIGN PATENT DOCUMENTS

| | | |
|---|---|---|
| EP | 1 731 993 | 12/2006 |
| FR | 2910160 | 6/2008 |
| GB | 2 416 962 | 2/2006 |
| JP | 2007-531113 | 11/2007 |
| JP | 2007-531158 | 11/2007 |
| JP | 2007-535273 | 11/2007 |
| WO | WO 2004/044728 A2 | 5/2004 |
| WO | WO 2004/075169 A2 | 9/2004 |
| WO | WO 2005/103863 | 11/2005 |
| WO | WO 2006/013363 A1 | 2/2006 |
| WO | WO 2008/132540 A1 | 11/2008 |
| WO | WO 2009/074185 A1 | 6/2009 |

OTHER PUBLICATIONS

International Search Report and Written Opinion mailed Feb. 11, 2010 for corresponding International Application No. PCT/US2009/050569.

Biet, M. et al., Discrimination of Virtual Square Gratings by Dynamic Touch on Friction Based Tactile Displays, Haptic Interfaces for Virtual Environment and Teleoperator Systems, 2008, Symposium, IEEE, Piscataway, NJ, XP 031339918, pp. 41-48, Mar. 2008.

Dewitt, A., Designing Sonification of User Data in Affective Interaction, Master of Science Thesis Stockholm, Sweden, XP 002551466, at hppt://w3.nada.kth.se/utbildning/grukth/exjobb/rapportlistor/2007/rapporter07/de_witt_anna_07142, as available via the Internet and printed Oct. 20, 2009.

Kaaresoja, T. et al., Snap-Crackle-Pop: Tactile Feedback for Mobile Touch Screens, Proceedings of the Eurohaptics 2006, XP 002551465, at http://lsc.univ-evry.fr/{eurohaptics/upload/cd/papers/f80, as available via the Internet and printed Oct. 20, 2009.

Oakley, I. et al., Contact IM: Exploring Asynchronous Touch over Distance, Palpable Machines Research Group, Media Lab Europe, XP 007910188, at http://people.cs.vt.edu/[wangr06/touch%20review%20origization/Oak002, as available via the internet and printed Oct. 20, 2009.

Rovers, A. et al., HIM: A Framework for Haptic Instant Messaging, CHI 2004 (CHI Conference Proceedings. Human Factors in Computing Systems), XP 002464573, Vienna Austria, Apr. 2004, p. 1313-1316.

Sekiguchi, Y. et al., Haptic Interface using Estimation of Box Contents Metaphor, Proceedings of ICAT 2003, Tokyo, Japan, XP 002551467, at http://www.vrsj.org/ic-at/papers/2003/00947_00000, as available via the Internet and printed Oct. 20, 2009.

Patent Cooperation Treaty, International Search Report, International Application No. PCT/US2009/050587, mailed Oct. 29, 2009.

Patent Cooperation Treaty, International Search Report, International Application No. PCT/US2009/050574, mailed Oct. 29, 2009.

Patent Cooperation Treaty, International Search Report, International Application No. PCT/US2009/050564, mailed Oct. 28, 2009.

Patent Cooperation Treaty, Invitation to Pay Additional Fees, Application No. PCT/US2009/050569, mailed Nov. 9, 2009.

Williamson, J. et al., Shoogle: Excitatory Multimodal Interaction on Mobile Devices, CHI 2007 Proceedings-Shake, Rattle and Roll: New Forms of Input and Output, 2007, pp. 121-124, XP002549378.

Patent Cooperation Treaty, International Search Report, International Application No. PCT/US2009/050579, mailed Oct. 21, 2009.

International Search Report mailed Mar. 23, 2010 for International Application No. PCT/US2010/022528.

Smith, J. et al., "Communicating emotion through a haptic link: Design space and methodology," Int. J. Human-Computer Studes, 2007, 65:376-387.

Snibbe, S.S. et al., "Haptic Techniques for Media Control," Proceedings of 14th Annual ACM Symposium on User Interface Software and Technology, Orlando, Florida, Nov. 2001.

Verplank, B. et al., "THE PLANK: Designing a simple haptic controller." Proceedings of the Conference on New Instruments for Musical Expression, Dublin, Ireland, May 24-26, 2012.

United States Patent and Trademark Office, Office Action, U.S. Appl. No. 12/502,795, dated Oct. 5, 2011.

United States Patent and Trademark Office, Office Action, U.S. Appl. No. 12/502,755, dated Nov. 16, 2011.

United States Patent and Trademark Office, Office Action, U.S. Appl. No. 12/502,795, dated Mar. 6, 2012.

United States Patent and Trademark Office, Office Action, U.S. Appl. No. 12/502,755, dated Apr. 25, 2012.

Brown, L. et al., Shake2Talk: Multimodal Messaging for Interpersonal Communication, (In: I. Oakley and S. Brewster, Eds.), Haptic and Audio Interaction Design, Second International Workshop, HAID 2007, Seoul, South Korea, Nov. 29-30, 2007, Proceedings. Volume 4813 of Lecture Notes in Computer Science, pp. 44-55, Springer, 2007.

Poupyrev, I. et al., Ambient Touch: Designing Tactile Interfaces for Handheld Devices, Proceedings of UIST'2002, ACM: pp. 51-60, 2002.

United States Patent and Trademark Office, Office Action, U.S. Appl. No. 12/502,702, dated Jun. 15, 2012.

United States Patent and Trademark Office, Office Action, U.S. Appl. No. 12/502,758, mailed Sep. 11, 2012.

United States Patent and Trademark Office, Office Action, U.S. Appl. No. 12/697,030, mailed Sep. 26, 2012.

United States Patent and Trademark Office, Office Action, U.S. Appl. No. 12/502,795, mailed Aug. 17, 2012.

Chinese Office Action dated Dec. 6, 2012 for corresponding Chinese Patent Application No. 200980127939.1.

(56) References Cited

OTHER PUBLICATIONS

Chinese Office Action dated Jan. 31, 2013 for corresponding Chinese Patent Application No. 200980128008.3.
Office Action dated Feb. 28, 2013 for corresponding U.S. Appl. No. 12/502,795.
Office Action dated Feb. 27, 2013 for corresponding U.S. Appl. No. 12/697,030.
Office Action mailed Nov. 13, 2012 for corresponding U.S. Appl. No. 12/502,702.
International Preliminary Report on Patentability mailed Aug. 11, 2011 for corresponding International Patent Application PCT/US2010/022528.
International Preliminary Report on Patentability mailed Jan. 27, 2011 for corresponding International Patent Application PCT/US2009/050569.
International Preliminary Report on Patentability mailed Jan. 27, 2011 for corresponding International Patent Application PCT/US2009/050564.
International Preliminary Report on Patentability mailed Jan. 27, 2011 for corresponding International Patent Application PCT/US2009/050574.
International Preliminary Report on Patentability mailed Jan. 27, 2011 for corresponding International Patent Application PCT/US2009/050587.
Chinese Office Action dated Nov. 29, 2012 for corresponding Chinese Patent Application No. 200980127938.7.
Chinese Office Action dated Nov. 13, 2012 for corresponding Chinese Patent Application No. 200980127978.1.
United States Patent and Trademark Office, Office Action, U.S. Appl. No. 12/697,030, mailed Jun. 3, 2013.
Notice of Reasons for Rejection, Japanese Application No. 2011-518849, dated May 28, 2013.

\* cited by examiner

SYSTEMS AND METHODS FOR MAPPING MESSAGE CONTENTS TO VIRTUAL PHYSICAL PROPERTIES FOR VIBROTACTILE MESSAGING

CROSS-REFERENCES TO RELATED APPLICATIONS

This patent application claims priority to: U.S. Provisional Patent Application No. 61/080,978, entitled "Systems and Methods for Physics-Based Tactile Messaging" filed Jul. 15, 2008; U.S. Provisional Patent Application No. 61/080,981, entitled "Systems and Methods for Mapping Message Contents to Virtual Physical Properties for Vibrotactile Messaging" filed Jul. 15, 2008; U.S. Provisional Patent Application No. 61/080,985, entitled "Systems and Methods for Shifting Sensor Haptic Feedback Function Between Passive and Active Modes" filed Jul. 15, 2008; U.S. Provisional Patent Application No. 61/080,987, entitled "Systems and Methods for Gesture Indication of Message Recipients" filed Jul. 15, 2008; U.S. Provisional Patent Application No. 61/148,312, entitled "Systems and Methods for Pseudo-Telepresence in a Shared Space" filed Jan. 29, 2009; and U.S. Provisional Patent Application No. 61/181,280, entitled "Systems and Methods for Transmitting Haptic Messages" filed May 26, 2009, the entirety of all of which are hereby incorporated by reference.

FIELD OF THE INVENTION

The present invention generally relates to messaging, and more particularly to systems and methods for mapping message contents to virtual physical properties for vibrotactile messaging.

BACKGROUND

Conventional tactile feedback in messaging systems is determined by the settings on a message recipient's messaging device, which may associate different types of messages with particular vibrations. These vibrations may be generic, and/or based on a prepackaged library of vibration effects included with the messaging device. Such vibrations are not authored by the user, and thus may not be considered personal to the sender or recipient of the message. Furthermore, such vibrations are not generated by the properties of the message contents. Accordingly, there is a need for systems and methods for mapping message contents to virtual physical properties for vibrotactile messaging.

SUMMARY

Embodiments of the present invention provide systems and methods for mapping message contents to virtual physical properties for vibrotactile messaging. For example, in one embodiment, a method for physics-based tactile messaging comprises receiving a sensor signal from a sensor configured to sense an interaction with a messaging device, determining a virtual physical parameter of a virtual message object based at least in part on the sensor signal, determining a haptic effect based at least in part on the virtual physical parameter, and generating a haptic signal configured to cause an actuator to output the haptic effect. In another embodiment, a computer-readable medium comprises program code for carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
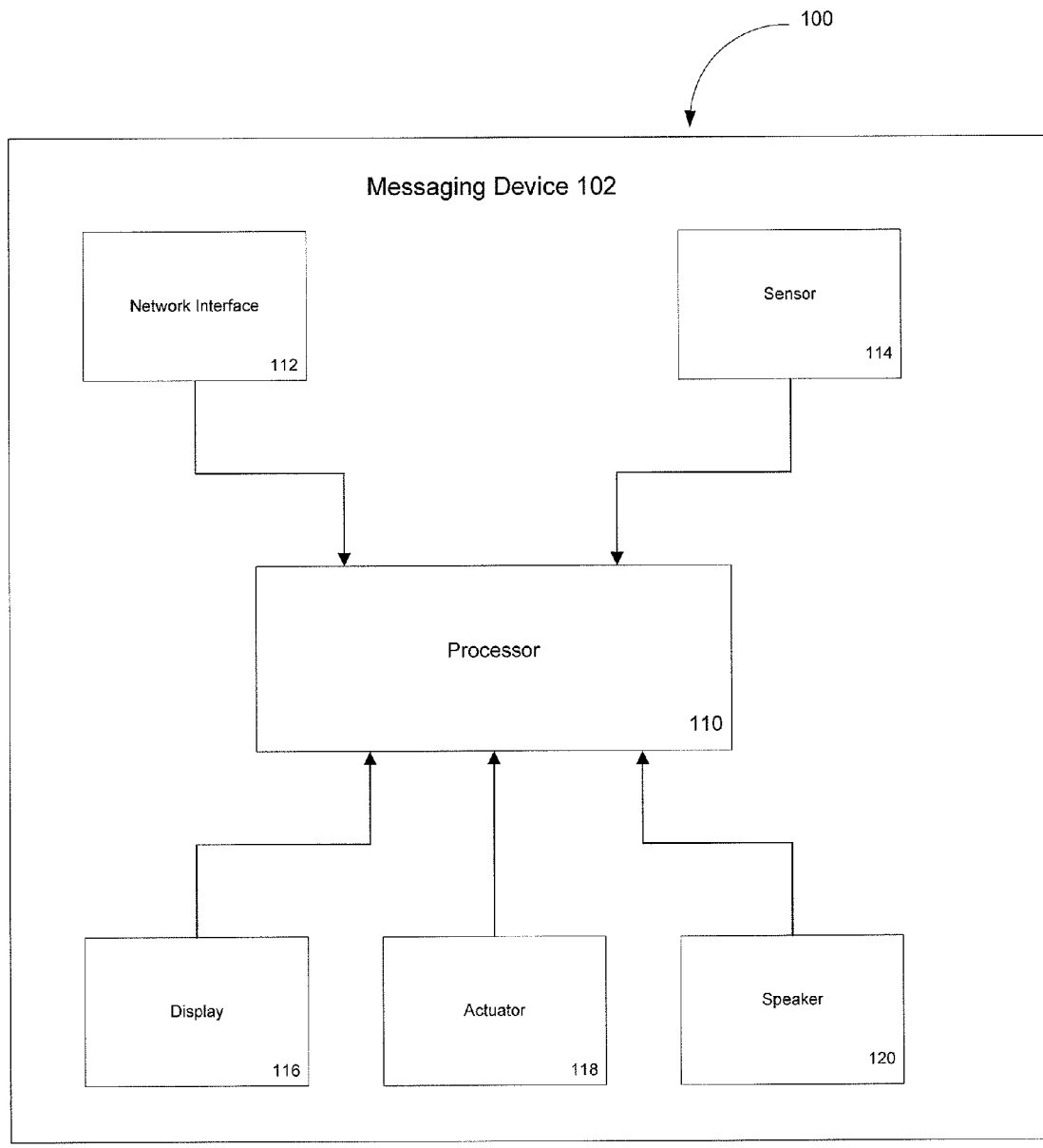
FIG. 1 is a block diagram of a system for mapping message contents to virtual physical properties for vibrotactile messaging according to one embodiment of the present invention.

Embodiments of the present invention provide systems and methods for mapping message contents to virtual physical properties for vibrotactile messaging.

Illustrative Embodiment of Vibrotactile Messaging

In one illustrative embodiment of the present invention, a messaging device such as a mobile phone comprises a processor in communication with a sensor and an actuator. The actuator is configured to generate a haptic effect. In one such illustrative embodiment, the messaging device comprises the Samsung SGH-i710 mobile computer equipped with Immersion Corporation's VibeTonz® vibrotactile feedback system. In another embodiment, the messaging device comprises Immersion Corporations TouchSense® Technology system also known as Immersion TouchSense® vibrotactile feedback system. Other messaging devices and haptic feedback systems may be utilized.

The messaging device may be capable of creating messages, represented as virtual message objects, and exchanging them with other messaging devices. Virtual message objects in the form of a ball, a tube, or an egg, may represent various types of messages, such as a non-verbal message (e.g. a smile), a text message, or a message with a file attachment. In addition to their shape and appearance, virtual message objects may have other properties, or virtual physical parameters, such as size, mass, collision behavior, and/or texture.

When a new virtual message object is created, a user may define one or more virtual physical parameters of the object through gestures on the touchscreen or on the device itself. A processor may receive such gestures in the form of a sensor signal, and determine a virtual physical parameter of the new virtual message object based at least in part on the sensor signal. For example, a user may create a new virtual message ball. Next, the user shakes the messaging device to define the elasticity of the new virtual message ball. A sensor such as an accelerometer or a gyroscope detects the shaking as changes in acceleration, inclination, inertia, or location, and transmits a sensor signal. The processor receives the sensor signal, and determines a virtual physical parameter of the new virtual message object, such as an elastic surface or behavior, imitating a real rubber ball.

After determining a virtual physical parameter of the new virtual message object based at least in part on the sensor signal, the processor determines a haptic effect based at least in part on the virtual physical parameter. Based on a fast jabbing motion, the processor may determine that the new virtual message object is brittle, or fragile. A haptic effect based on a brittle or fragile virtual physical parameter may comprise a vibration imitating an egg cracking or window breaking. If the virtual message object is defined as small and elastic, a corresponding haptic effect may imitate a rubber ball bouncing against a wall. The processor may map or translate one, some, or all of the virtual physical properties into haptic effects associated with the virtual message object.

Finally, the processor generates a haptic signal configured to cause an actuator to output the haptic effect. The haptic signal is then output to the actuator which produces the haptic effect. For example, as the virtual message object is contacted through a touch-screen, the messaging device may vibrate or shake, simulating the effect of touching or feeling the virtual message object. By generating haptic feedback, the messaging device can convey one or more virtual physical parameters associated with the virtual message.

This illustrative example is given to introduce the reader to the general subject matter discussed herein. The invention is not limited to this example. The following sections describe various additional embodiments and examples of methods and systems for mapping message contents to virtual physical properties for vibrotactile messaging.

Mapping Message Contents to Virtual Physical Properties

Embodiments of the invention presented herein provide systems and methods for mapping message contents to virtual physical properties for vibrotactile messaging. An application for mapping message contents may take sensor data as input, extract a feature from the sensor data, map the feature to a virtual physical parameter, and synthesize a haptic effect based on the virtual physical parameter. Mapping message contents to virtual physical properties can facilitate non-linguistic communication through audio, visual, and haptic feedback which models a physical metaphor.

Virtual Message Objects and Virtual Physical Properties

In a physical metaphor, virtual objects can behave like real, physical objects. The properties, or virtual physical parameters, of each virtual object inform how each virtual message object behaves. Thus, in a physical metaphor of a messaging system, messages such as text messages, voicemail, or file attachments are represented as virtual message objects with virtual physical parameters. Such virtual message objects may populate a multi-dimensional message inbox, or a virtual message environment. Inside the virtual message environment, virtual message objects can interact with each other and behave like real, physical objects.

Each virtual message object may represent an individual message, such as a text message, a picture message, a video message, a voicemail, a reminder, or a non-verbal message such as a smiley-face or a frown. For example, a virtual message object in the form of a tube or rolled-up scroll may represent a text message. And a virtual message object in the form of an egg or a capsule may represent a message with an attachment, such as a video, picture, or music file. Virtual message objects may also represent various forms of non-verbal communication, such as gestures, facial expressions, or emotions. A virtual message ball may correspond to a non-verbal message such as an indication of playfulness. Or a virtual message arrow may represent a poke or a jabbing gesture (i.e. to request or demand attention). Some effective virtual message objects may have easily identifiable visual and/or haptic properties and/or effects. These properties help a user intuitively understand the contents of a message without physically looking at the device. For example, the clanging keys of a virtual message object in the form of a typewriter may represent a message from work or a word processing file.

Inside a virtual message environment, virtual message objects can interact with each other and the environment, such as by bouncing, rolling, or even breaking. The behavior of virtual message objects, or how they interact, is based at least in part on each virtual message object's properties, or virtual physical parameters. Some virtual physical parameters, such as size, mass, shape, collision behavior, texture, or visual representation, are relatively static parameters, or inherent properties of the virtual message object itself. Other virtual physical parameters, such as urgency, lifetime, and/or attitude, may be transitory or temporary parameters. Such variable virtual physical parameters may be associated with how the virtual message object is sent or received from one device to another. The virtual physical parameters of a virtual message object may be based at least in part on properties of the message itself. For instance, the file size of a message attachment, a length of a text message, an area or a resolution of a picture attachment, a length of a song attachment, or a length of a video attachment may be used to determine the size or mass of a virtual message object.

In some embodiments, virtual physical parameters are determined based on sensor signals generated when a user interacts with the messaging device. For instance, a user may move or interact with a device to create and/or define a new virtual message object. In one embodiment, a user blows on a microphone to inflate a new virtual message balloon. The virtual message balloon's virtual physical size may directly correlate to the length of time the user blew on the microphone. In another embodiment, a user with a picture phone may define a new virtual message object by taking a picture. For example, after taking a picture of a basketball, the messaging device is assigned properties, such as size, texture, or appearance, extracted from or based at least in part on properties of the picture.

The virtual message environment may also implement a token metaphor for its contents. In a token metaphor, virtual objects are passed back and forth between devices, mimicking the exchange of a definite physical object. A token, such as a virtual message object, may be passed from one messaging device to another. When one messaging device sends a virtual message object to another messaging device, the virtual message object disappears from the sending messaging device, as if it was physically passed to the receiving messaging device.

When a messaging device receives a new virtual message object, the messaging device may output effects, such as haptic effects, to signify that a new virtual message object has been received, and is in the virtual message environment. For example, when a virtual message ball is received, sound and haptic effects may be played to mimic a bouncing ball, signifying to the user that a new virtual message ball has been received.

The audio, visual, and/or haptic effects associated with virtual message objects may be determined based at least in part on one or more virtual message properties of a virtual message object. A thin, egg-shelled virtual message object may crack or break upon impact with the virtual message environment. Alternatively, a toy ball or ping-pong ball may continually bounce off the boundaries of the virtual message environment. A virtual message object in the form of a bubble may be associated with a brief, pointed haptic effect, indicative of a bubble bursting.

Illustrative Systems for Mapping Message Contents to Virtual Physical Properties Referring now to the drawings in which like numerals indicate like elements throughout the several Figures, FIG. 1 is a block diagram of a system for mapping message contents to virtual physical properties for vibrotactile messaging according to one embodiment of the present invention. As shown in FIG. 1, the system 100 comprises a messaging device 102, such as a mobile phone, portable digital assistant (PDA), portable media player, or portable gaming device. The messaging device 102 comprises a processor 110. The processor 110 is in communication with a network connection 112, a sensor 114, a display 116, an actuator 118, and a speaker 120. The messaging device 102 may show a virtual message environment generated by the processor 110 on the display 116.

The processor 110 is in communication with the network connection 112. The network connection 112 may comprise one or more methods of mobile communication, such as infrared, radio, Wi-Fi, or cellular network communication. In other variations, the network connection 112 comprises a wired network connection, such as an Ethernet connection or a modem. The messaging device 102 can be configured to exchange messages, such as voice messages, text messages, data messages, or virtual message objects with other messaging devices (not shown) over networks such as a cellular network or the Internet.

The processor 110 is also in communication with one or more sensors 114. The sensor 114 may comprise an accelerometer, a gyroscope, a GPS sensor, a touch-sensitive input device (e.g. touch screen, touch-pad), a texture stylus, an imaging sensor, or some other type of sensor. The one or more sensors 114 may be configured to detect changes in acceleration, inclination, inertia, or location. For example, the messaging device 102 may comprise an accelerometer configured to measure acceleration of the messaging device 102. Or the messaging device 102 may comprise a location sensor, rotary velocity sensor, light sensor, pressure sensor, texture sensor, camera, microphone, or other type of sensor. In the embodiment shown, the one or more sensors 114 are configured to send a sensor signal to the processor 110. The processor 110 can be configured to receive the sensor signal from the one or more sensors 114.

In some embodiments of the present invention, users record virtual physical parameters of a virtual message object through interactions, such as movements or gestures. These physical interactions are detected by the one or more sensors 114. As the messaging device 102 is tilted, shaken, or otherwise moved, the one or more sensors 114 may detect these movements, and generate a sensor signal based at least in part on the movement of the messaging device 102. In one embodiment, an accelerometer sensor is configured to detect the inclination and acceleration of the messaging device 102. As the messaging device 102 is tilted, the accelerometer can be configured to send signals to the processor based at least in part on the tilt and/or acceleration of the messaging device 102. In another embodiment, the display 116 comprises a touch-screen configured to detect gestures or position inputs. As a finger is positioned or dragged on the touch-screen display 116, the touch-screen is configured to send signal to the processor 110 based at least in part on the finger's movement.

Upon receiving a sensor signal, the processor 110 may be configured to determine a virtual physical parameter of a virtual message object based at least in part on the sensor signal. Virtual physical parameters may be determined based on features extracted from sensor signals, such as color, texture, or speed. After determining a virtual physical parameter, the processor 110 may be configured to determine a haptic effect based at least in part on the virtual physical parameter. A haptic effect may simulate a rough-textured virtual message through vibrations or hard, irregular jolts.

In one embodiment, a user selects a new virtual message egg from a menu. Next, the user may move the messaging device 102 in a large circle or oval, to indicate the size of the virtual message egg. After determining the large size of the virtual message egg based on the large movement of the messaging device 102, the processor 110 may determine a haptic effect simulating the cracking of a large egg, such as through a number of vibrations.

As shown in FIG. 1, the processor 110 is in communication with a display 116. The processor 110 can be configured to generate a graphical representation of a virtual message environment, to be shown on display 116. The display 116 may comprise a touch-sensitive input device, such as a touch screen, configured to send and receive signals from the processor 110. Virtual message objects shown on the display 116 may be directly manipulated through a touch-screen. For example, two dimensional finger gestures on a touch screen display may select, touch, feel, drag, or throw a virtual message object within the virtual message environment.

The processor 110 is also in communication with one or more actuators 118. The processor 110 may transmit a haptic signal associated with a haptic effect to the one or more actuators 118. The actuators 118 receive haptic signals associated with haptic effects, and then output haptic effects. The actuator 118 may be, for example, an electric motor, an electro-magnetic actuator, a voice coil, a linear resonant actuator, a piezoelectric actuator, a shape memory alloy, an electro-active polymer, a solenoid, an eccentric rotating mass motor (ERM) or a linear resonant actuator (LRA).

Finally, in the embodiment shown, the processor 110 is in communication with a speaker 120. The processor 110 may be configured to determine a sound effect based at least in part on the interaction between a virtual message object and the virtual message environment, and send an audio signal to the speaker based at least in part on the sound effect. The speaker 120 can be configured to generate the sound effect based at least in part on the audio signal generated by the processor 110. The output of a sound effect and a haptic effect may be coordinated, or generated at the same time as the haptic effect. In one embodiment, the speaker may generate the sound effect substantially simultaneously as the actuator generates the haptic effect.

Sound effects generated by the processor 110 may simulate an interaction between a virtual message object and the virtual message environment, and/or an interaction between a first virtual message object and one or more other virtual message objects. Examples of sound effects include a ball bouncing against a wall, an arrow hitting a wall with a thud, or an egg cracking. For example, a messaging device 102 may receive a virtual message object in the form of a water balloon from another messaging device. Upon the virtual message object's arrival, a sound effect of a water balloon splashing against a wall may be generated at the same time as a vibration simulating the splash.

Figure 2:
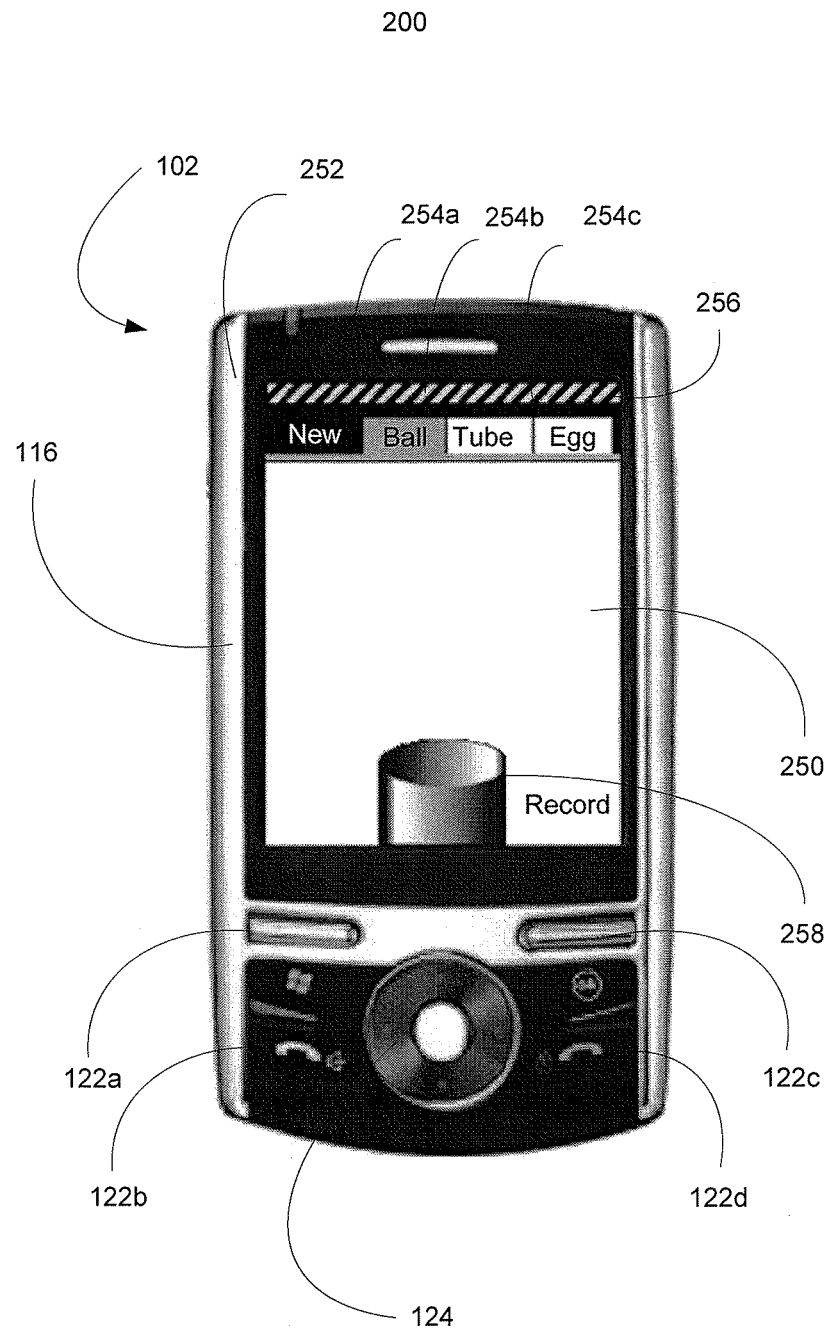
FIG. 2 is an illustration of a system for mapping message contents to virtual physical properties for vibrotactile messaging according to one embodiment of the present invention.

FIG. 2 is an illustration of a system for mapping message contents to virtual physical properties for vibrotactile messaging according to one embodiment of the present invention. The elements of the system 200 are described with reference to the system depicted in FIG. 1. A variety of other implementations are possible.

As shown in FIG. 2, the system 200 comprises a messaging device 102, such as a mobile phone, portable digital assistant (PDA), portable media player, or portable gaming device. The messaging device 102 can be configured to send and receive signals, such as voice mail, text messages, and other data messages, over a network such as a cellular phone network or the Internet. The messaging device 102 may include a wireless and/or a wired network connection 112. Although the device 102 is illustrated as a handheld messaging device in FIG. 2, other embodiments may use other devices, such as video game systems, video game controllers, personal media players, personal digital assistants, and/or personal computers to send and receive virtual message objects.

As shown in FIG. 2, the messaging device 102 comprises a display 116, buttons 122a, 122b, 122c, 122d, and a track ball 124. In addition to the buttons 122a, 122b, 122c, 122d, and track ball 124, the messaging device 102 may comprise a directional pad, a touchpad, a scroll wheel, a rocker switch, a joystick, or other forms of input (not shown in FIG. 2).

The display 116 of the mobile device 102 may comprise a touch-sensitive input device, such as a touch-screen. The display 116 can be configured to receive signals from the processor 110, and generate a graphical environment, such as an inbox, a browser, a gaming environment, a virtual message environment. The display 116 may also be configured to generate a virtual message authoring environment 250. The virtual message authoring environment 250 may comprise a menu 252 for selecting a type of virtual message object to author or create. As shown in FIG. 2, the menu 252 comprises options for authoring a new virtual message ball 254a, a new virtual message tube 254b, or a new virtual message egg 254c. The menu 252 may comprise other types of virtual message objects such as a heart or a water balloon (not shown in FIG. 2).

The virtual message authoring environment 250 may comprise an authoring indicator 256. The authoring indicator 256 may alert a user that the messaging device 102 is in authoring or recording mode. As shown in FIG. 2, the authoring indicator 256 comprises a warning bar located above the menu 252, at the top of the virtual message authoring environment 250. The virtual message authoring environment may be configured to display the authoring indicator 256 when the sensor is recording or capturing information associated with the virtual message object. In one instance, when the record button 122c is pressed or activated, a recording mode is entered, and the authoring indicator 256 appears. When the recording mode is stopped, the authoring indicator 256 may dim or disappear.

When the messaging device 102 is in recording mode, one or more sensors 114 may record or capture information, such as a gesture, associated with a virtual physical parameter. Some gestures comprise two-dimensional gestures received by a touch-screen. Examples of two-dimensional gestures include pointing (i.e. positional input) or drawing. Other gestures may comprise three-dimensional gestures measured by an accelerometer, a gyroscope, or some other sensor. Three-dimensional gestures may include rotating, flicking, jabbing, or otherwise moving the entire messaging device 102. One or more sensors 114 may also record other non-verbal information, such as by sensing pressure on a pressure sensor, taking a picture with a camera, or recording a sound with a microphone.

The virtual message authoring environment 250 may also comprise a new virtual message object pipe 258. As one or more new virtual message objects are created, they may appear as if they are coming out of the new virtual message object pipe 258 and into the virtual message authoring environment 250. The new virtual message object pipe 258 may reinforce the token metaphor of a virtual message object. For example, when a new virtual message object is created, and emerges from the new virtual message object pipe 258, a user of the messaging device 102 may intuitively deduce that the new virtual message object represents a physical token that can be passed back and forth between different messaging devices.

Figure 3:
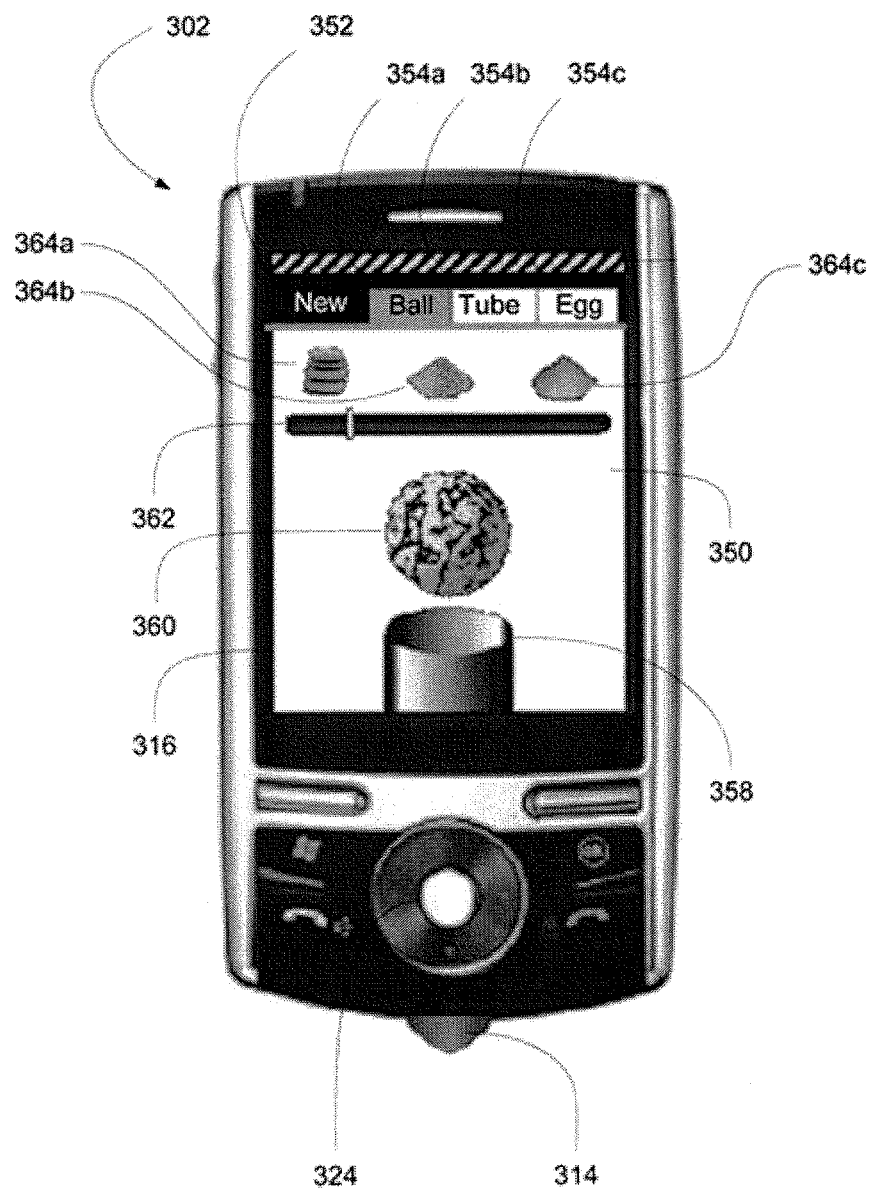
FIG. 3 is an illustration of a system for mapping message contents to virtual physical properties for vibrotactile messaging according to one embodiment of the present invention.

FIG. 3 is an illustration of a system for mapping message contents to virtual physical properties for vibrotactile messaging according to one embodiment of the present invention. As shown in FIG. 3, the system 300 comprises a messaging device 302 with a touch-screen display 316, texture sensor 314, and track ball 324.

The touch-screen display 316 is showing a virtual message authoring environment 350. As shown in FIG. 3, the virtual message authoring environment 350 comprises a menu 352 for selecting the type of a new virtual message object. In menu 352 a user may select a new virtual message ball 354a, a new virtual message tube 354b, or a new virtual message egg 354c. Although the menu 352 illustrates three types of virtual message objects, other types of virtual message objects may be selected (not shown in FIG. 3). The virtual message authoring environment 350 also comprises a new virtual message pipe 358. When a new virtual message ball 354a is selected, a new virtual message ball 360 may be shown exiting the new virtual message pipe 358.

During creation of a new virtual message object, such as new virtual message ball 360, the virtual message authoring environment 350 may display a slider bar 362. A user may adjust the slider bar 362 to change one or more virtual physical properties of a new virtual message object. In FIG. 3, the slider bar 362 is being used to adjust the texture of the virtual message object 360. On one end of the slider bar, an icon 364a shown as a stack of rocks illustrates one texture that can be assigned to the new virtual message object 360. In the middle of the slider bar 362, a second icon 364b shown as a pile of course sand illustrates a second texture that can be assigned to the virtual message object 360. On the other end of the slider bar, an icon 364c shown as a pile of fine sand illustrates a third texture that can be assigned to the virtual message object 360.

The slider bar 362 may be manipulated or engaged through the touch-screen 316, through the track ball 324, or through some other means. Alternatively, one of the icons 364a, 364b, 364c can be engaged through the touch-screen 316. As the slider bar 362 is engaged, the touch-sensitive sensor sends a signal to a processor of the messaging device 302. The processor receives the sensor signal, and can determine a virtual physical property of the virtual message object based at least in part on the sensor signal associated with the slider bar input.

Figure 4:
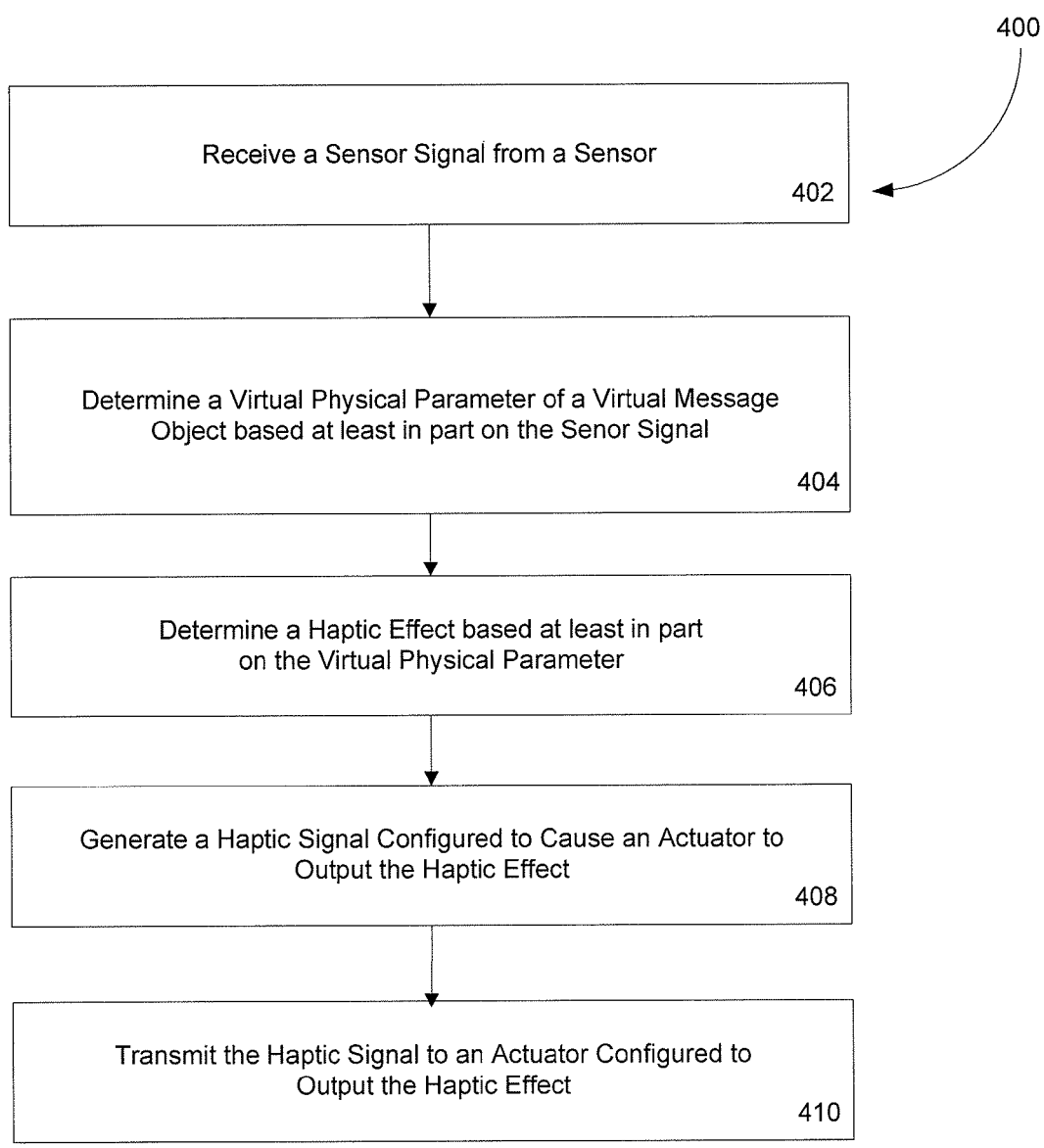
FIG. 4 is a flow diagram of a method for mapping message contents to virtual physical properties for vibrotactile messaging according to one embodiment of the present invention.

Illustrative Methods for Mapping Message Contents to Virtual Physical Properties for Vibrotactile Messaging FIG. 4 is a flow diagram of a method for mapping message contents to virtual physical properties for vibrotactile messaging according to one embodiment of the present invention. In the method 400, a processor receives a sensor signal from a sensor 402. The processor may be in communication with one or more sensors, such as an accelerometer, a gyroscope, a GPS sensor, a touch-sensitive input device (e.g. touch screen, touch-pad), a texture stylus, a pressure sensor, an imaging sensor, a microphone, or some other type of sensor. A user may create a new virtual message object, such as a water balloon, by selecting a water balloon type from a menu, entering a record mode, and tipping the messaging device downward to fill the water balloon. An accelerometer or a gyroscope may detect the change in inclination, a touch-screen may detect a figure drawn on its surface, or a microphone may detect sound. After detecting such gestures or actions, a sensor signal may be transmitted to the processor of the messaging device.

Next the processor determines a virtual physical parameter of a virtual message object based at least in part on the sensor signal 404. After receiving a sensor signal from a sensor, the processor may extract gestural and/or environmental features from the sensor signal. A gestural feature may comprise information related to the movement of the device, or a movement on the device. An environmental feature may comprise information related to the surroundings or condition of the device. Gestural and/or environmental extraction algorithms may be applied to data received from a sensor. Environmental features, such as the shape or color of an object in a picture, may be extracted from the sensor signal. Alternatively, the direction the messaging device was moved, or a character input on a touch-screen may be extracted from the sensor signal. A threshold may be set such that a certain acceleration, orientation, or periodicity triggers the creation of a token. For instance, if the device is only moved a small distance, the processor may determine that the movement was inadvertent, or not meant to trigger the creation of a token. If the device is moved a large distance, the processor may determine that the movement was intended to trigger the creation of a token.

The processor may determine a virtual physical parameter of the new virtual message object by mapping gestural and/or environmental features extracted from the sensor signal to a virtual physical parameter. For example, a predetermined set of gestural and/or environmental features may be stored in a data store along with a corresponding virtual physical parameter. When the gestural and/or environmental feature is extracted, the data store is searched, and the appropriate virtual physical parameter is determined. The determination may be based at least in part on the dynamics of a gesture, such as the speed of the touch-screen contact, speed of the movement, size of the movement, periodicity of movement, or repetition of the movement.

As one example, a user may create a plurality of new virtual message objects, such as hearts or balloons through a gentle, repetitive motion. With each cycle, or repetitive gesture, the processor may create a new virtual message object, potentially leading to a plurality of balloons filling up the virtual message authoring environment. In a further example, a user may engage or touch each balloon through the touch-screen display. By slowly dragging the balloon up or down on the touch-screen, the processor may determine a virtual physical weight of the balloon. If the balloon is slowly dragged upwards, then the processor may determine the balloon is light, and should float around in the virtual message environment. Alternatively, if the balloon is quickly dragged to the bottom of the display, the processor may determine that the balloon is dense and/or heavy, and should sink to the bottom of the virtual message environment.

The virtual physical parameters of virtual message objects may be based at least in part on other factors. A file, such as a video file or an image file, can be associated with a virtual message object, such as a virtual message capsule. The processor may extract metadata from the file, use that metadata to determine a virtual physical parameter. In one example, a user creates a new virtual message capsule. Next, the user scrolls through a list of files, and selects a particular file to attach to the virtual message capsule by dragging it onto the virtual message capsule. The processor may determine the size of the virtual message capsule based at least in part on the size of the particular file dragged onto the virtual message object. As another example, the processor may determine the texture or color of a virtual message capsule based on the type of file that is associated with the capsule.

After determining a virtual physical parameter, the processor determines a haptic effect based at least in part on the virtual physical parameter 406. For example, a user may create a new virtual message ball and jostle the device to define a bouncy collision behavior for the new virtual message ball. The processor may determine a haptic effect simulating the virtual message ball bouncing against the virtual message environment, mimicking the gesture used to define the virtual message ball when it was created.

If the virtual message environment contains a single virtual message object such as a large, brittle egg, the processor may determine a haptic effect simulating the egg breaking (e.g. a single large crack). As another example, if there are many virtual message objects comprising kinetic bouncy balls, the processor may determine a large number of small, quick vibrations are appropriate, to simulate the kinetic balls bouncing off the environment and each other. By associating the haptic effects with the virtual physical parameters of the virtual message objects, a user may correlate certain haptic effects with certain types of objects. For example, when the actuator outputs a haptic effect simulating a beating heart, the user may immediately guess that she has received an intimate message, or virtual message object, without looking at the messaging device.

The processor generates a haptic signal configured to cause an actuator to output the haptic effect 408. Finally, the processor transmits the haptic signal to one or more actuators configured to output the haptic effect 410. In one variation, the processor determines a haptic effect simulating an arrow hitting a wall, such as a thud, and generates a haptic signal configured to cause an actuator to output the thud. The haptic signal is then transmitted to the actuator, which outputs the haptic effect.

Figure 5:
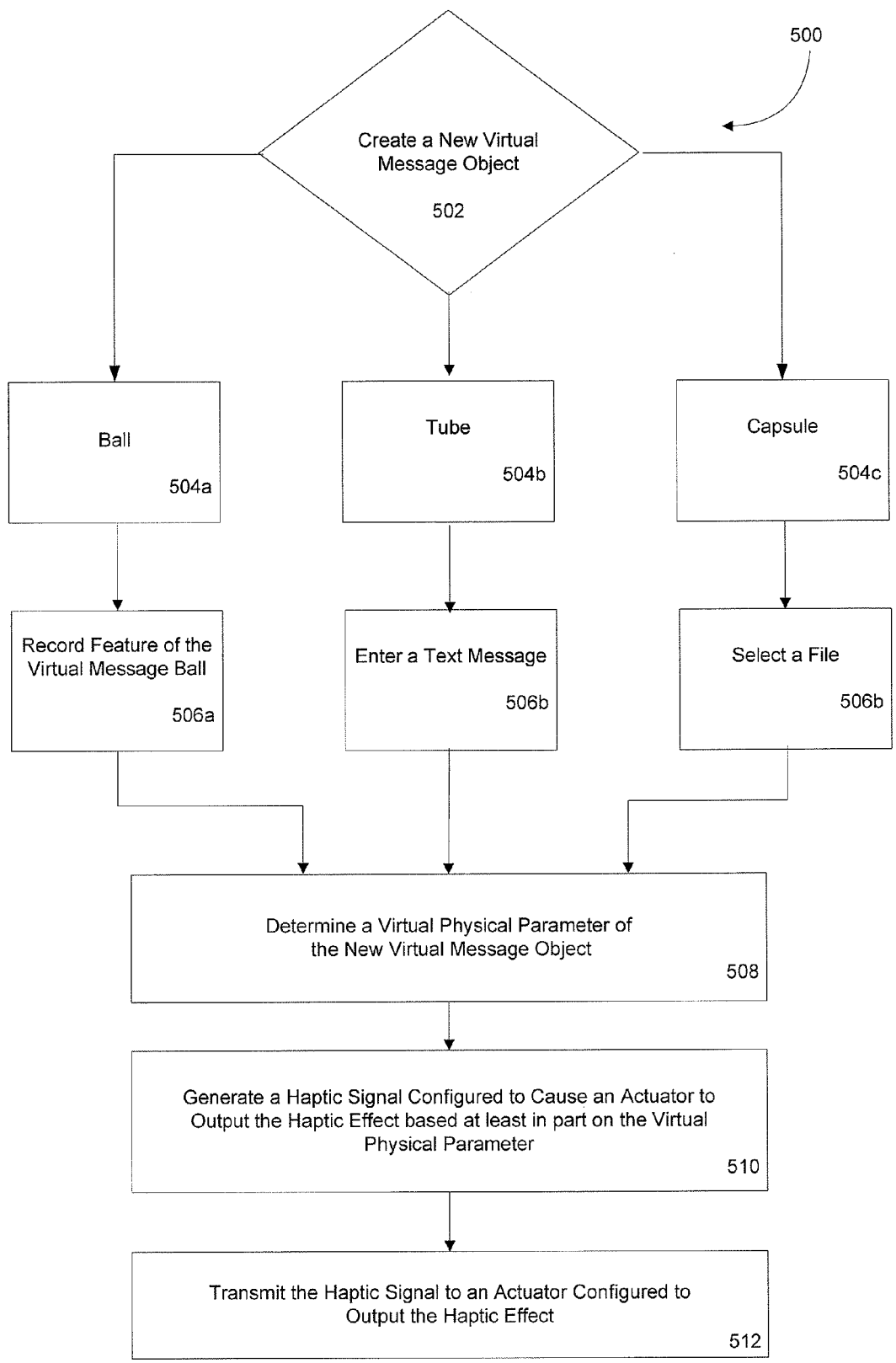
FIG. 5 is a flow diagram of a method for mapping message contents to virtual physical properties for vibrotactile messaging according to one embodiment of the present invention.

FIG. 5 is a flow diagram of a method for mapping message contents to virtual physical properties for vibrotactile messaging according to one embodiment of the present invention. In the method 500, a new virtual message object is created 502. New virtual message objects may be created in a virtual message authoring environment. The virtual message authoring environment may suspend the physical model of the multi-dimensional inbox, or virtual message environment. By suspending the physical model, sensor signals may be associated with a virtual physical parameter of a new virtual message object, rather than associating a sensor signal with an interaction with an existing virtual message object inside the virtual message environment.

A new virtual message object may be created by selecting an option from a menu. The virtual message authoring environment may display a scrolling menu for choosing one of several types of existing virtual message objects, and/or an option for creating a new type of virtual message object. As shown in FIG. 5, a new virtual message ball 504a, a new virtual message tube 504b, or a new virtual message capsule 504c can be created. Other types of virtual message objects may be created in other embodiments. For example, a new virtual message object may comprise a heart, an arrow, a water balloon, or a basketball. Each type of virtual message object may have specific virtual message properties associated with it. For example, a virtual message basketball may have a virtual physical texture simulating a real basketball.

In some instances, a user selects the virtual message object from a list of pre-defined virtual message object types. By using a predefined virtual message object type, a user may be able to quickly and explicitly define specific aspects of the new virtual message object, which can be mapped or translated into one or more virtual physical parameters. In other instances, a user may author a new type of virtual message object from scratch. The user may be able to define a virtual message object with specific, individualized virtual physical parameters based at least in part on signals from a touchscreen, an accelerometer, a gyroscope, GPS sensor, or some other type of sensor.

After a new virtual message ball is created 504a, a feature of the virtual message ball is recorded 506a. Features may be recorded by one or more sensors of a messaging device. A color feature may be recorded from a photo sensor, a texture feature may be recorded from a texture stylus sensor, or a gesture may be recorded from an accelerometer.

In step 504b, a new virtual message tube is created. A virtual message object in the form of a tube, or a scroll, may represent a text message. Thus, if a new virtual message tube is created 504b, then a text message may be entered 506b. A user may enter text through a keypad attached to the messaging device, through a virtual keyboard shown on a touchscreen display, or through some other means.

In step 504c, a virtual message capsule is created. A virtual message object in the form of a capsule or an egg may represent a message with a file attachment. Thus, if a new virtual message capsule is created 504c, then a file to attach (or include inside the capsule) is selected 506c. A virtual message capsule may comprise a message with a file attachment, such as a video file, a sound file, or an image file. A user may select a file attachment by scrolling through a list of files, or dragging a file onto a virtual message capsule. As one alternative, a user may take a picture and select the picture to enclose within the file capsule.

After information about the new virtual message object is recorded 506a, entered 506b, or selected 506c, a virtual physical parameter of the new virtual message object is determined 508. The virtual physical parameter may be determined based at least in part on information received from a sensor. When a sensor records a feature of the virtual message ball 506a, the virtual physical parameter may be determined based at least in part on information recorded by the sensor. For example, a user may tilt or make a gesture with the messaging device to record a feature associated with the size of the new virtual message object. The virtual physical size of the new virtual message object may then correspond to the size of the gesture or movement, a small movement of the messaging device may produce a small virtual message object, while a large movement or gesture of the messaging device may produce a large virtual message object.

When a new virtual message tube is created 506b, the length of the text message (such as the number of lines or the number of words) may determine, at least in part, one or more virtual physical parameters of the new virtual message tube, such as the tube's size or length. A haptic effect based on the size or length of the virtual message tube may be determined. Thus, haptic sensations may convey information about the virtual message tube.

In the case of a new virtual message capsule 504c, the size of the file selected 506c may determine the virtual mass of the new virtual message object. Because a haptic effect may be based at least in part on the virtual mass of the virtual message object, a haptic effect particularly designed for that virtual message object can be generated. The haptic sensations that result may convey information about the file capsule such as the amount of data it contains or the type of data.

A haptic signal is generated to cause an actuator to output a haptic effect based at least in part on the virtual physical parameter of the new virtual message object 510. Finally, the haptic signal is transmitted to an actuator configured to output the haptic effect 512. The haptic effect may be based at least in part on an interaction between the virtual message object and the virtual message environment. The behavior of the virtual message object may be based at least in part on the virtual physical parameters of the virtual message object. An egg-shelled virtual message object may crack or break upon impact with the virtual message environment. Alternatively, a virtual message arrow may arrive with one resounding thud. A virtual message bubble may be associated with a brief, pointed haptic effect, indicative of a bubble bursting.

If the new virtual message object is a large ball, then a haptic signal may be generated to cause an actuator to output a haptic effect mimicking the large ball bouncing and/or rolling around in the virtual message environment. If the new virtual message object is a small capsule, then a haptic signal may be generated to cause an actuator to output a haptic effect mimicking the small capsule breaking inside the virtual message environment.

Haptic effects may be associated with virtual message objects. The haptic effects may be preserved as the virtual message object is exchanged between messaging devices. For example, a processor may associate a virtual message capsule with specific haptic effects. When the capsule is sent from one mobile device to another, the haptic data is also sent to the receiving device. This haptic data may be used to generate haptic feedback in the receiving device.

Figure 6:
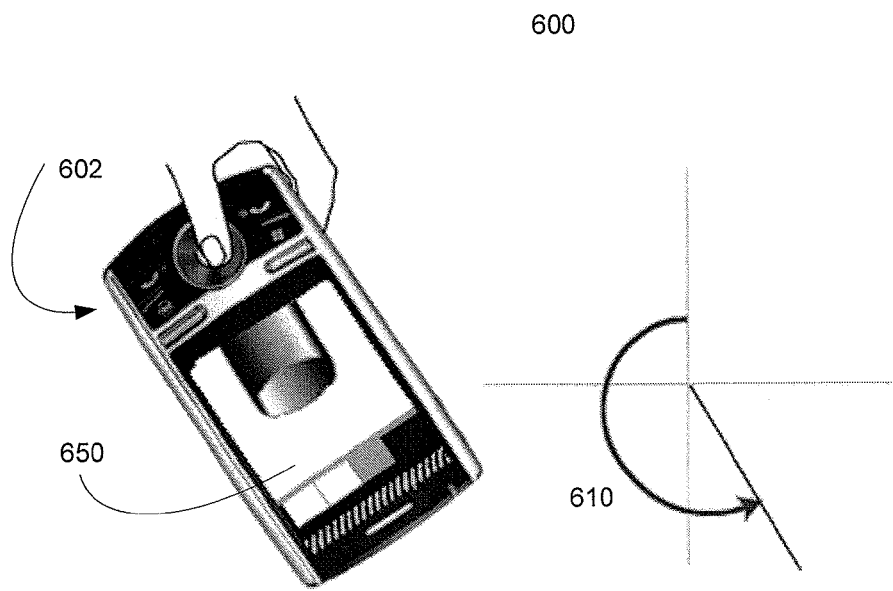
FIG. 6 is an illustration of a system for mapping message contents to virtual physical properties for vibrotactile messaging according to one embodiment of the present invention.

FIG. 6 is an illustration of a system for mapping message contents to virtual physical properties for vibrotactile messaging according to one embodiment of the present invention. As shown in FIG. 6, the system 600 comprises a messaging device 602. The messaging device 602 displays a virtual message authoring environment 650. The messaging device 602 includes one or more processor(s) (not shown in FIG. 6).

Additionally, the messaging device 602 may include one or more sensors (not shown in FIG. 6). The sensor, such as an accelerometer, may be configured to detect changes in acceleration, inclination, inertia, or location of the messaging device. As other examples, the messaging device may include an air pressure sensor, location sensor, rotational velocity sensor, image sensor, pressure sensor, or some other type of sensor. The sensor(s) are configured to send a sensor signal to a processor.

In one variation, acceleration sensing can be used to capture a gesture or movement associated with creating a virtual message object. In another variation, a touch-sensitive input device such as a touch-screen is used to capture a drawing associated with a new virtual message object. A gyroscopic sensor may detect changes in the orientation of the messaging device in the x and y planes. As shown in FIG. 6, the mobile device 602 is moved in a direction according to arrow 610. The processor may determine that a virtual message object created from the gesture illustrated in FIG. 6 is large, round, and readily rolls around a virtual message environment. A corresponding haptic effect may be a gentle, smooth vibration.

Figure 7:
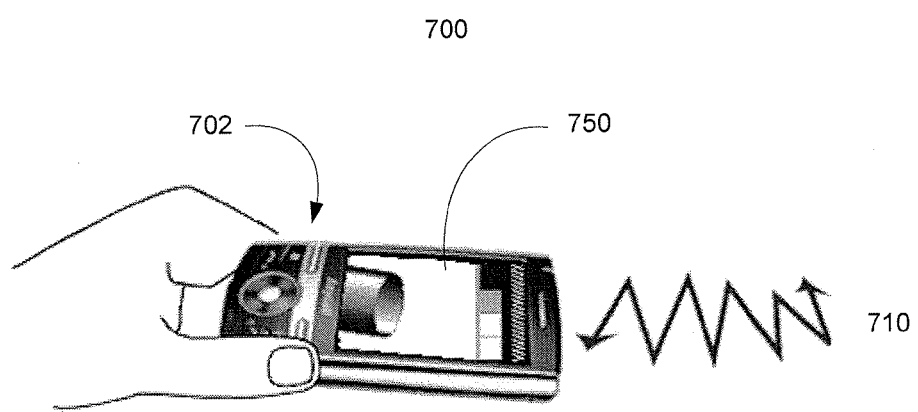
FIG. 7 is an illustration of a system for mapping message contents to virtual physical properties for vibrotactile messaging according to one embodiment of the present invention.

FIG. 7 is an illustration of a system for mapping message contents to virtual physical properties for vibrotactile messaging according to one embodiment of the present invention. As shown in FIG. 7, the system 700 comprises a messaging device 702. The messaging device displays a virtual message authoring environment 750. The messaging device 702 may include one or more processors (not shown in FIG. 7) and one or more sensors (not shown in FIG. 7).

As shown in FIG. 7, a user moves or shakes the messaging device in short, horizontal motions indicated by the direction of arrow 710. The sensor data extracted from each movement or gesture illustrated in FIG. 7 can be used to create a new virtual message object with specific virtual physical properties. The processor may determine that a virtual message object created from the gesture illustrated in FIG. 7 may be a small, rough object. A corresponding haptic effect may be a succession of quick jolts.

Each haptic effect may be associated with the virtual message object and preserved. For example, the haptic effect may be included in the profile of the virtual message object. In this way a messaging device which receives the virtual message object also receives the signal corresponding to haptic effect associated with that virtual message object. In such a manner, users may communicate through non-verbal haptic messages.

Embodiments of the present invention can be implemented in digital electronic circuitry, or in computer hardware, firmware, software, or in combinations of them. In one embodiment, a computer may comprise a processor or processors. The processor comprises a computer-readable medium, such as a random access memory (RAM) coupled to the processor. The processor executes computer-executable program instructions stored in memory, such as executing one or more computer programs for messaging. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

GENERAL

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A method comprising:
    receiving a sensor signal from a sensor configured to sense an interaction with a messaging device;
    determining a virtual physical parameter based at least in part on the sensor signal;
    applying the virtual physical parameter as a characteristic of a virtual message object, wherein the virtual message object is configured to be sent to a mobile device;
    determining a haptic effect based at least in part on the virtual physical parameter; and
    generating a haptic signal configured to cause an actuator to output the haptic effect.

2. The method of claim 1, further comprising transmitting the haptic signal to an actuator configured to output the haptic effect, and outputting the haptic effect.

3. The method of claim 1, wherein the sensor is configured to detect: contact, pressure, acceleration, inclination, inertia, or location.

4. The method of claim 1, wherein the sensor comprises: an accelerometer, a gyroscope, a touch-sensitive input device, a camera, or a GPS sensor.

5. The method of claim 4, wherein the sensor signal is associated with a gesture.

6. The method of claim 5, wherein the gesture is a two dimensional gesture comprising: a finger position or a finger gesture.

7. The method of claim 5, wherein the gesture is a three dimensional gesture comprising: a device gesture or a device orientation.

8. The method of claim 1, wherein the virtual physical parameter comprises: a size, a mass, a shape, a collision behavior, or a texture.

9. The method of claim 1, wherein the virtual message object comprises: a ball, a tube, or a capsule.

10. The method of claim 1, wherein the virtual physical parameter is based at least in part on a file size associated with the virtual message object, a length of a text message associated with the virtual message object, a width and a length of an image associated with the virtual message object, a length of a song associated with the virtual message object, or a length of a video associated with the virtual message object.

11. A non-transitory computer-readable medium comprising program code, the program code comprising:
    program code to receive a sensor signal from a sensor configured to sense an interaction with a messaging device;
    program code to determine a virtual physical parameter based at least in part on the sensor signal;

program code to apply the virtual physical parameter as a characteristic of a virtual message object, wherein the virtual message object is configured to be sent to a mobile device;

program code to determine a haptic effect based at least in part on the virtual physical parameter; and program code to generate a haptic signal configured to cause an actuator to output the haptic effect.

12. A system, comprising:

a processor, configured to:

receive a sensor signal from a sensor configured to sense an interaction with a messaging device;

determine a virtual physical parameter based at least in part on the sensor signal;

apply the virtual parameter as a characteristic of a virtual message object, wherein the virtual message object is configured to be sent to a mobile device;

determine a haptic effect based at least in part on the virtual physical parameter;

generate a haptic signal configured to cause an actuator to output the haptic effect; and an actuator configured to receive the haptic signal and output the haptic effect.

13. The system of claim 12, further comprising: a sensor in communication with the processor.

14. The system of claim 13, wherein the sensor is configured to detect: contact, pressure, acceleration, inclination, inertia, or location.

15. The system of claim 13, wherein the sensor comprises: an accelerometer, a gyroscope, a touch-sensitive input device, a camera, or a GPS sensor.

16. The system of claim 12, wherein the messaging device further comprises a display.

17. The system of claim 16, wherein the display comprises a touch screen.

18. The system of claim 12, wherein the virtual physical parameter comprises: a size, a mass, a shape, a collision behavior, or a texture.

19. The system of claim 12, wherein the virtual message object comprises: a ball, a tube, or a capsule.

20. The system of claim 12, wherein the sensor signal is associated with a gesture.

21. The system of claim 20, wherein the gesture is a two dimensional gesture comprising: a finger position or a finger gesture.

22. The system of claim 20, wherein the gesture is a three dimensional gesture comprising: a device gesture or a device orientation.

23. The system of claim 12, wherein the messaging device further comprises a speaker configured to generate a sound effect coordinated with the haptic effect.

* * * * *